March 14, 1933.  W. PUTNAM  1,901,119
FLUSH VALVE
Filed Jan. 5, 1931  2 Sheets-Sheet 1
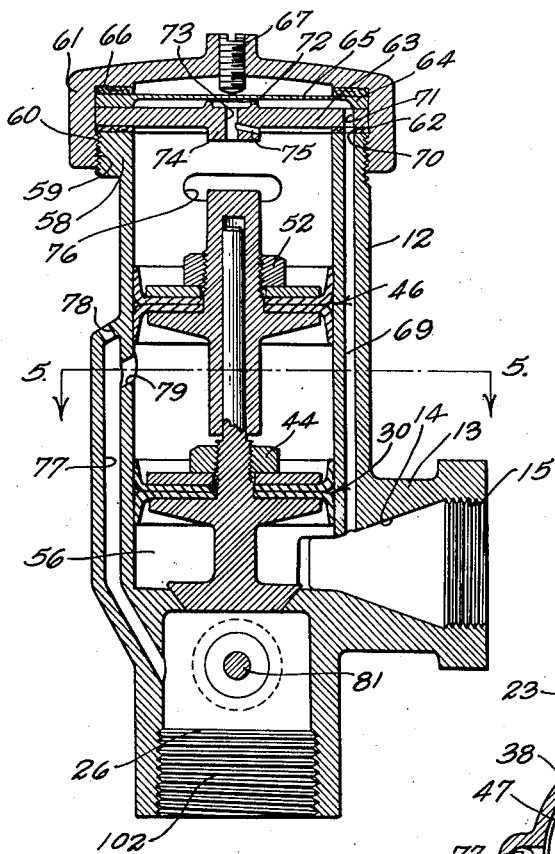
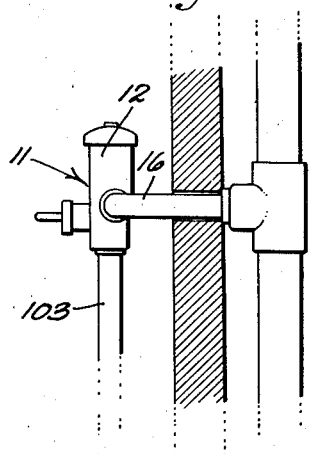
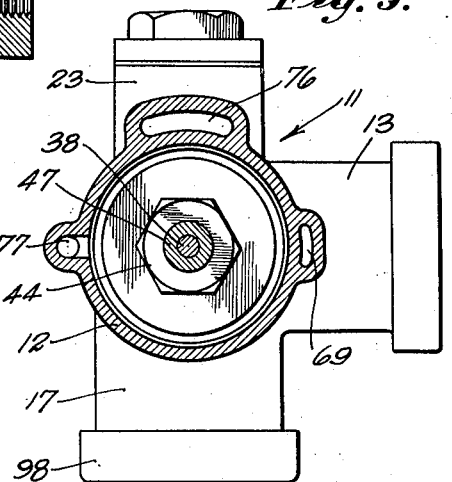
INVENTOR:
WALTER PUTNAM
BY
ATTORNEY.

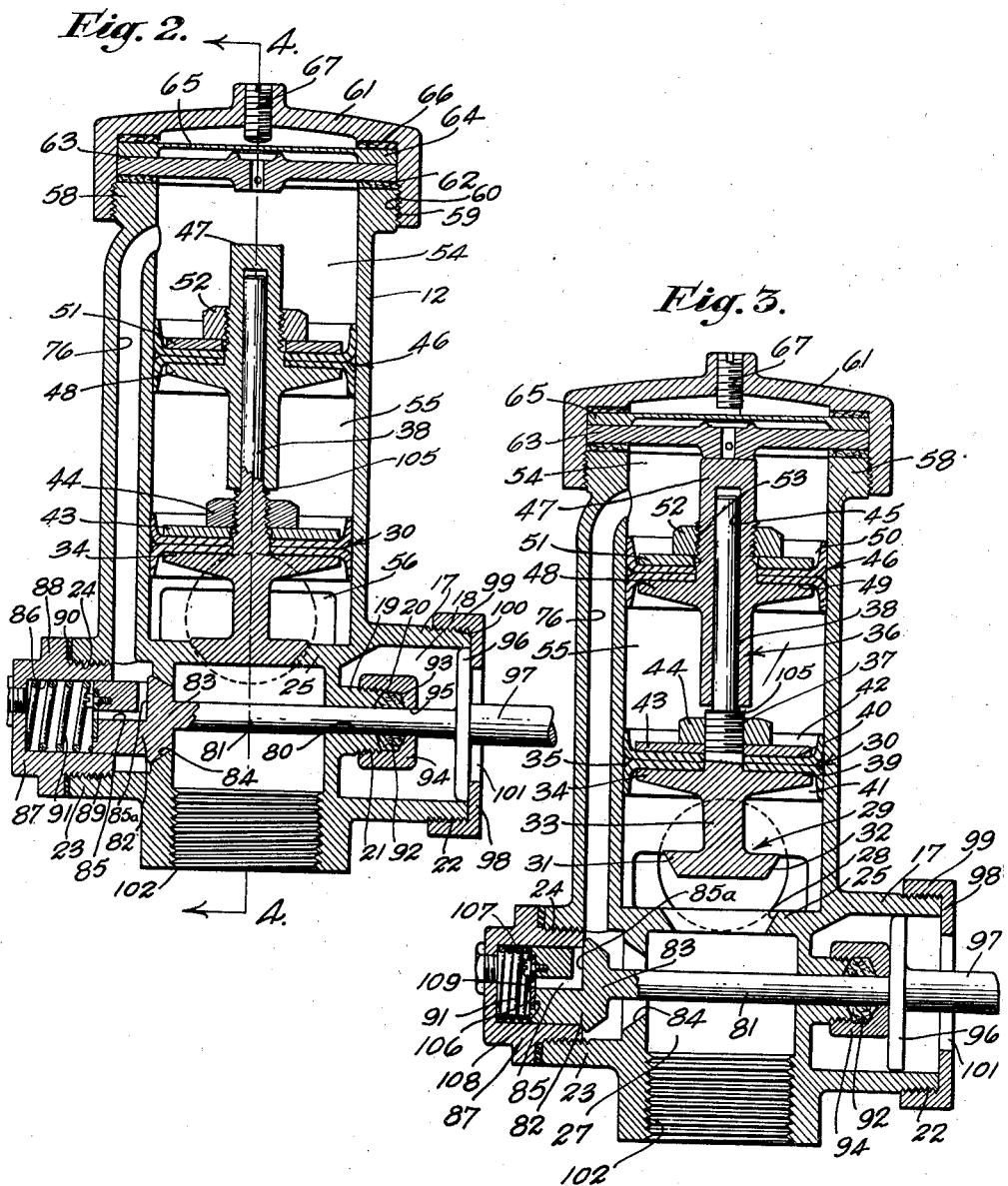

Patented Mar. 14, 1933

1,901,119

UNITED STATES PATENT OFFICE

WALTER PUTNAM, OF PASADENA, CALIFORNIA

FLUSH VALVE

Application filed January 5, 1931. Serial No. 506,714.

My invention relates to valves, and more particularly to a flush valve for connecting supply and discharge members.

Such valves are sometimes subjected to suction in the supply member by a disconnection of a supply pipe or by insufficiency in the size of the supply pipes so that when heavy draft is made upon the supply member in the lower floors of a building a suction in the supply members on the upper floors of the building results. This suction of the supply member may result in water being siphoned from the discharge member through the flush valve into the supply member.

It is an object of my invention to provide a flush valve which will prevent the siphoning of water through the discharge member into the supply member by a decrease in pressure in the supply member.

It is a further object of my invention to provide a flush valve of the type described in which the return of liquid from the discharge member to the supply member is prevented by atmospheric pressure.

It is another object of my invention to provide a flush valve of the type described which includes a closure member normally retained in a closed position preventing the passage of liquid from the supply member to the discharge member by the fluid pressure in the supply member.

It is a further object of my invention to provide a flush valve of the type described which is easy to assemble, positive in operation, sightly in appearance, and capable of being economically manufactured.

In the following description I shall describe one embodiment of my invention which is capable of performing the foregoing objects and providing the foregoing advantages, and others, some of which will be made evident hereinafter. This description may be better understood with reference to the accompanying drawings in which, Fig. 1 is a utility view showing in elevation the flush valve of my invention connected to supply and discharge members.

Fig. 2 is a sectional view of the valve of my invention.

Fig. 3 is a sectional view similar to Fig. 2 with the movable parts disposed in a different position.

Fig. 4 is a sectional view taken as indicated by the line 4—4 of Fig. 2.

Fig. 5 is a sectional plan view taken as indicated by the line 5—5 of Fig. 4.

Referring to the drawings, which are for illustrative purposes only, the numeral 11 indicates the flush valve of my invention which includes a valve body or shell 12. As illustrated in Figs. 4 and 5, the valve shell is provided with a horizontal extension 13 which communicates through a frusto-conical opening 14 with the interior of the shell 12. The extension 13 is provided with threads 15 which are adapted for threadedly joining the extension 13 to a supply member 16, illustrated in Fig. 1. The shell 12 is also provided with a cylindrical projection 17, illustrated as having its axis below and perpendicular to the axis of the extension 13. As illustrated in Figs. 2 and 3, the projection 17 has a substantially cylindrical bore providing a receptacle 18 within the projection 17 and separated from the interior of the valve shell 12 by the wall of the valve shell. Formed on the wall of the valve shell 12, concentric with the axis of the projections 17, is an outwardly extending hub 19, the outer end 20 of which is concave. Provided on the hub 19 adjacent the outer end 20 are external threads 21, for a purpose which will be later described. The projection 17 is likewise provided with external threads 22 at its outer end.

Formed on the valve shell 12 concentric with the axis of the projection 17 is an annular flange 23 having internal threads 24 at its outer end.

The valve shell 12 has a substantially cylindrical interior divided by a seat member 25 into two portions. The seat member 25 is integral with the valve shell 12 and provides upon the axis of the valve shell 12 a frusto-conical valve seat 28. The valve seat 28 is adapted to receive a valve member 29 which, as illustrated in Figs. 2 and 3, is attached to a primary plunger 30.

The valve member 29 includes a horizontal flange 31 of a thickness somewhat greater than the thickness of the seat member 25. The periphery 32 of the valve member 29 is frusto-conical, and is adapted to be received in the valve seat 28 so that the valve member 29 is in fluid-tight relationship with the seat member 25. The horizontal flange 31 is formed on the lower end of a connecting member 33, on the upper end of which is formed a plunger flange 34. The plunger flange 34 is of a diameter somewhat less than the internal diameter of the valve shell 12 and is provided with an upper surface 35 normal to the axis of the valve shell 12.

Formed on the plunger flange 34, and extending upwardly therefrom, is a guide member 36 which includes an externally threaded portion 37 and a guide rod 38.

Associated with the primary plunger 30 are two gaskets 39 and 40. The gaskets 39 and 40 are disposed around the guide member 36 and above the plunger flange 34 so that the lower gasket 39 engages the upper surface of the flange 34. The gaskets 39 and 40 are cup-shaped and faced in opposite directions so that the annular flange 41 of the lower gasket 39 extends downwardly, and the flange 42 of the upper gasket 40 extends upwardly. A plate 43 having an external diameter substantially equal to the diameter of the flange 34 is disposed around the guide member 36 above the upper gasket 40 and secured in place by a nut 44 threaded upon the portion 37 of the guide member 36.

The guide rod 38 extends upwardly with its end adjacent the upper end of the valve shell 12 and slidably disposed in a cylindrical recess 45 formed in the secondary plunger 46. The cylindrical recess 45 is formed in a cylindrical sleeve 47 upon which there is formed an annular flange 48 similar to the flange 34, previously described. Gaskets 49 and 50 are disposed around the sleeve 47 above the flange 48, these gaskets being similar to the gaskets 39 and 40, previously described. A retaining plate 51 having an external diameter substantially equal to the flange 48 is disposed around the sleeve 47 above the gaskets 49 and 50, and retained in place by a nut 52 secured upon a threaded portion 53 of the sleeve 47. As is well illustrated in Figs. 2 and 3, the sleeve 47 of the secondary plunger 46 extends above the nut 52 and below the flange 48 and effectually journals the guide rod 38.

Inasmuch as the primary plunger 30 and the secondary plunger 46 are in fluid-tight engagement with the valve shell 12, the interior of the valve shell 12 is divided into an upper chamber 54 extending from the upper end of the valve shell 12 to the secondary plunger 46, an intermediate chamber 55 between the secondary plunger 46 and the primary plunger 30, and a lower chamber 56 between the primary plunger 30 and the seat member 25.

The upper end of the valve shell 12 is thickened to provide an outwardly extending annular flange 58 which is provided with external threads 59 adapted to engage internal threads 60 formed on a head member 61. Disposed upon the upper end of the shell 12 within the head member 61 is a packing ring 62, the upper surface of which is engaged by a head plate 63. The head plate 63 is engaged by an annular flange 64 formed on the periphery of a diaphragm plate 65. An upper packing ring 66 is disposed between the diaphragm plate 65 and the head member 61 so that when the head member 61 is threaded upon the hub 58 the head plate 63 and the diaphragm plate 65 are disposed as they are illustrated in Figs. 2, 3, and 4. The head member 61 is concaved downwardly so that the interior of its upper end is spacially related to the diaphragm plate 65. Threaded through the head member 61 on the axis of the shell 12 is an adjusting screw 67, the lower end of which is disposed adjacent the diaphragm plate 65.

Formed in the shell 12 is a duct 69 which extends vertically from the horizontal extension 13 to the upper end of the shell 12. As is well illustrated in Fig. 5, the duct 69 is substantially elliptical in cross-section with its major axis arcuated about the axis of the shell 12. At its upper end the duct 69 registers with an opening 70 in the packing ring 62 and an opening 71 in the head plate 63, as illustrated in Fig. 4. The duct 69 thus serves to convey fluid under pressure from the supply member 16 to the space between the diaphragm plate 65 and head plate 63. Formed on the upper surface of the plate 63 is an annular flange 72 surrounding a central cylindrical opening 73 formed through the head plate 63. As is illustrated in Fig. 4, the annular flange 64 of the diaphragm plate 65 is of a thickness such that fluid is permitted to pass between the annular flange 72 and the diaphragm plate 65 and downwardly through the cylindrical opening 73. The rate at which the fluid passes between the annular flange 72 and the diaphragm plate 65 is controlled by the adjusting screw 67 which, by its contact with the upper surface of the diaphragm plate 65, varies the distance between the lower surface of the diaphragm plate 65 and the annular flange 72. Formed in a central downwardly depending projection 74 provided on the lower surface of the head plate 63 is a by-pass 75 connecting the cylindrical opening 73 to the periphery of the projection 74, for a purpose which will be later described.

Also formed in the shell 12 is a discharge duct 76, best illustrated in Figs. 2 and 3, which extends from the annular flange 23 to adjacent the upper end of the shell 12. As is well illustrated in Fig. 5, the discharge duct 76 has the major axis of its cross-section arcuated about the axis of the shell 12, and provides a cross-sectional area greater than the cross-sectional area of the supply duct 69. As is illustrated in Figs. 2, 3, and 4, the upper end of the discharge duct 76 is at such a distance from the upper end of the shell 12 that it is not covered by the secondary plunger 46 when that plunger is in its uppermost position.

The shell 12 is also provided with an air duct 77 which extends from substantially the middle of the valve shell 12 to the lower portion 27 of the valve shell 12. An orifice 78 is formed in the wall of the shell 12 connecting the air duct 77 to the exterior of the shell, and an opening 79 is provided through the shell 12 near the upper end of the air duct 77. The opening 79 serves to connect the air duct 77 to the interior of the shell 12 and is so positioned that it is never closed by either the primary plunger 30 or the secondary plunger 46.

The hub 19 within the projection 17, previously described, is provided with a cylindrical bore 80 in which there is slidably disposed a plunger rod 81. The plunger rod 81 extends across the lower portion of the shell 12 and is provided at its end with a plunger 82 having a frusto-conical valve member 83 formed thereon. As illustrated in Fig. 2, the valve member 83 is adapted to be received in a valve seat 84 formed in the valve shell 12 concentric with the annular flange 23 of the shell 12. The plunger 82 is cylindrical in form and is provided with a radial fluid passage 85a which connects the discharge duct 76 to an axial passage 85 extending to the end of the plunger 82.

The cylindrical plunger 82 is slidably disposed within a cylindrical bore 86 provided in a nut 87. As is illustrated in Figs. 2 and 3, the nut 87 has an annular flange 88, the diameter of which is substantially equal to the diameter of the annular flange 23, and external threads 89 adapted for engagement with the internal threads 24 of the annular flange 23. A packing ring 90 may be provided between the flange 88 and the end of the flange 23 so that when the nut 87 is threaded into the annular flange 23, as illustrated in Figs. 2 and 3, the nut 87 is in fluid-tight relationship with the shell 12. A compression spring 91 is disposed in the cylindrical bore 86 for resiliently urging the plunger 82 out of the bore 86.

The plunger rod 81 extends through the cylindrical bore 80 of the hub 19 and through a packing 92. The packing 92 is disposed in the concave end 20 of the hub 19 and a recess 93 in a packing nut 94. The packing nut 94 is threaded upon the external threads 21 of the hub 19 to retain the packing 92 in fluid-tight engagement with the plunger rod 81, and is provided with a cylindrical opening 95 through which the plunger rod 81 extends.

The plunger rod 81 is of a length such that its outer end is adjacent the outer end of the cylindrical projection 17.

Disposed within the cylindrical projection 17 adjacent its outer end is an engager plate 96 which has a diameter somewhat less than the inner diameter of the projection 17. The engager 96 is provided with an operating handle or lever 97, the operating lever 97 being formed upon the axis of the engager plate 96, and projecting outwardly beyond the cylindrical projection 17.

Secured to the outer end of the annular projection 17 is a cap member 98 having an annular flange 99 with internal threads 100 which are adapted for engagement with the external threads 22 at the outer end of the cylindrical projection 17. The cap member 98 is provided with a central opening 101 through which the operating lever 97 extends.

The lower end of the valve shell 12 is cylindrical in form, and provided with internal threads 102 which are adapted to be secured to external threads formed on a discharge member 103.

The operation of my invention is as follows:

The extension 13 being secured to the supply member 16, and the lower end of the valve shell 12 being secured to the discharge member 103, as illustrated in Fig. 1, and the parts being in the positions in which they are illustrated in Fig. 2, fluid under pressure passes from the supply member 16 through the extension 13 and into the lower chamber 56 of the shell 12. Fluid under pressure also passes from the interior of the extension 13 upwardly through the supply duct 69 and between the head plate 63 and the diaphragm plate 65 to the cylindrical opening 73. This fluid under pressure passes into and fills the upper chamber 54 of the valve shell 12, and passes therefrom through the exhaust duct 76 and the passages 85a and 85 in the plunger 82 to the cylindrical bore 86 of the nut 87. Inasmuch as the intermediate chamber 55 of the valve shell 12 and the lower portion 26 of the valve shell 12 are connected through the air duct 77 with the exterior of the valve shell, the pressure within the intermediate chamber 55 and the lower portion 26 of the shell 12 is equal to atmospheric pressure. It should be apparent that at this time the fluid pressures upon the upper surface of the secondary plunger 46 and the lower surface of the primary plunger 30 are substantially equal. The fluid pressure acting downwardly on the upper surface of the valve member 29 is therefore unbalanced and serves to retain the valve member 29 in the seated position in which it is illustrated in Fig. 2. The fluid pressure in the cylindrical bore 86 of the nut 87, combined with the resilient action of the spring 91, serves to retain the plunger 82 in the position in which it is illustrated in Fig.

2. With the parts in the positions just described, there is no communication between the fluid supply member 16 and the discharge member 103.

If now the outer end of the operating lever 97 is moved toward the interior of the valve shell 12 on the axis of the plunger rod 81, or if it is rocked in any direction, the engager plate 96 exerts sufficient pressure upon the plunger rod 81 to move the plunger 82 into the cylindrical bore 86 of the nut 87. This movement of the plunger 82 moves the valve member 83 out of engagement with the seat 84, permitting the fluid under pressure within the discharge duct 76 to pass downwardly into the discharge member 103. The connection of the discharge duct 76 to the discharge member 103 relieves the fluid pressure upon the upper surface of the secondary plunger 46 so that the fluid pressure upon the lower surface of the primary plunger 30 becomes unbalanced and forces the primary plunger 30 upwardly. The primary plunger 30 moves upwardly, an annular shoulder 105 separating the threaded portion 37 from the remainder of the guide rod 38 engaging the lower end of the cylindrical sleeve 47, so that the primary plunger 30 urges the secondary plunger 46 upwardly. The diaphragm plate 65, being adjacent the annular flange 72, insures a slow rate of flow of fluid under pressure from the supply member 16 to the upper chamber 54. The cross-sectional area of the discharge duct 76 being so much larger than the cross-sectional area of the supply duct 69, fluid supplied to the upper chamber 54 is discharged into the discharge member 103 as rapidly as it is received in the upper chamber 54 so that the fluid pressure on the lower surface of the primary plunger 30 moves both the primary plunger 30 and the secondary plunger 46 upwardly until the upper end of the sleeve 47 engages the lower end of the projection 74, as is illustrated in Fig. 3. At this time fluid under pressure is permitted to enter the upper chamber 54 from the supply duct 69 through the by-pass 75 formed in the projection 74, as previously described.

During the upward movement of the primary plunger 30, the valve member 29 is lifted out of engagement with the valve seat 28 so that fluid under pressure is permitted to flow from the supply member 16 through the lower chamber 56 and downwardly to the discharge member 103.

When the pressure upon the operating lever 97 is removed, the compression spring 91 operates to urge the plunger 82 out of the cylindrical bore 86 so that the valve member 83 engages the seat 84, thus shutting off communication between the discharge duct 76 and the discharge member 103. The fluid under pressure that is provided through the supply duct 69 to the upper chamber 54 being thus prevented from escaping, exerts a downward pressure on the upper surface of the secondary plunger 46. This pressure serves to force the secondary plunger 46 downwardly, and the plunger 46, by virtue of the engagement of the sleeve 47 with the annular shoulder 105 of the guide member 36, operates to force the primary plunger 30 downwardly. This downward movement of the secondary plunger 46 and the primary plunger 30 is proportional to the rate of flow of fluid from the supply duct 69 to the upper chamber 54, so that the time required to force the valve member 29 into engagement with the seat 28 to shut off communication between the supply member 16 and the discharge member 103 may be varied by adjusting the adjusting screw 67. When the valve member 29 has been moved downwardly into engagement with the seat 28, the parts have assumed the positions in which they are illustrated in Fig. 4, as previously described.

In the event suction is applied to the extension 13 as by the disconnection of a portion of the supply member 16, or a draft upon the supply member 16 between the source of fluid supply and the valve 11 which exceeds the capacity of the supply member 16, the valve of my invention prevents the passage of fluid from the discharge member 103 into the supply member 16. This may be best explained with reference to Fig. 4. A partial vacuum being applied to the extension 13, the fluid is drawn from the cylindrical bore 86 of the nut 87 and the discharge duct 76 and the upper chamber 54 through the opening 73 and the supply duct 69 into the supply member 16. Fluid is likewise drawn from the lower chamber 56 into the supply member 16. There is now exerted upon the upper surface of the secondary plunger 46 a suction which may operate to move the plunger 46 upwardly to the position in which it is illustrated in Fig. 3. Inasmuch as the sleeve 47 of the secondary plunger 46 is slidable upon the guide member 36, this upward movement of the secondary plunger 46 has no tendency to move the primary plunger 30 upwardly. There is likewise exerted a suction upon the lower surface of the primary plunger 30 and the upper surface of the valve member 29. Inasmuch as the area of the lower surface of the primary plunger 30 is greater than the area of the upper surface of the valve member 29, the tendency of a partial vacuum thus applied is to retain the primary plunger 30 and the valve member 29 in their lowermost positions, as illustrated in Fig. 2. Because the intermediate chamber 55 communicates through the air duct 77 with the atmosphere, there is exerted upon the upper surface of the primary plunger 30 a pressure equal to atmosphere pressure. The air duct 77 communicating also with the lower portion 26 of the interior of the valve shell 12, there is exerted upon the lower surface of the valve member 29 a pressure equal to atmospheric pressure. Because of the fact that the area of the primary plunger 30 exceeds the area of the valve member 29, the net result of the application of atmospheric pressure to the parts just described is a force urging the primary plunger 30 and the valve member 29 downwardly so that they retain their lowermost positions, as illustrated in Fig. 2. It should thus be seen that, when suction is applied to the supply member 16, fluid is prevented from being drawn through the valve seat 28 from the discharge member 103 to the supply member 16. The compression spring 91 operates to retain the plunger 828 in the position illustrated in Fig. 2, so that fluid is prevented from being drawn from the discharge member 103 through the discharge duct 76 and the supply duct 69 to the supply member 16. The valve of my invention therefore effectually prevents any return of fluid to the supply member when the supply member is subjected to suction.

In the event that the valve member 83, or the companion valve seat 84, or the valve member 29, or its companion seat 28, should become so worn that there is slight leakage therethrough when the supply member 16 is subjected to a partial vacuum, sufficient air is supplied through the air duct 77 to the lower portion 26 of the valve shell 12 to prevent the siphoning into the supply member 16 of any liquid from the discharge member 103.

As has been pointed out, the diaphragm plate 65 and the adjusting screw 67 provide a means for varying the rate of flow of fluid from the supply member 16 to the upper chamber 54 of the valve shell 12 and thus varying the quantity of fluid which passes into the discharge member 103 during the closing of the valve member 29. For varying the time between the release of the operating force upon the handle 97 and the diminution of the flow from the supply member 16 to the discharge member 103, there is provided a control plate 106 secured by a screw 107 in a recess 108 in the end of the plunger 82. As illustrated in Fig. 2, the control plate 106 has an opening 109 adapted for registration with the axial passage 85 of the plunger 82. By swinging the control plate 106 about the screw 107 until the opening 109 registers with the axial passage 85 to the desired extent, the rate of flow of liquid through the passages 85a and 85 is controlled. Inasmuch as the valve member 29 does not begin its downward movement until the bore 86 is filled, it is apparent that this feature of my invention provides a means for varying the period of time after the release of the operating force on the handle 97, during which there is a full flow of fluid from the supply member to the discharge member.

In the light of the foregoing explanation of the operation of the flush valve of my invention, it should be apparent that I have provided a valve of the class described which effectually prevents the siphoning of water from the discharge member into the supply member by a decrease of pressure in the supply member. It should likewise be apparent that the prevention of this siphoning effect is accomplished in part by atmospheric pressure.

Inasmuch as there is exerted upon the upper surface of the valve member 29 of the valve of my invention an unbalanced fluid pressure, it is evident that I have provided a valve of the class described which is normally retained in a closed position preventing the passage of fluid from the supply member to the discharge member by the fluid pressure in the supply member. It should also be apparent that the flush valve of my invention is positive in operation and capable of being economically manufactured.

While that embodiment of my invention hereinbefore illustrated and described is fully capable of performing those objects and providing those advantages hereinbefore set forth, there are various other embodiments of my invention likewise capable of performing those objects and providing those advantages, and I therefore wish my invention to be understood as not restricted to the specific embodiment I have herein illustrated and described.

The terms "upwardly" and "downwardly" and similar terms defining location or movement are employed in the claims to define location or movement with the structure disclosed in the position shown in the drawings and are not employed in an absolute sense since the structure may be used in other positions.

The term "actuator" used in the claims should be broadly construed to mean either plungers moving in a cylinder or other equivalent devices such as diaphragm operated members which are old in the art.

I claim as my invention:
1. In a device adapted to be used in a toilet flushing system in which water under pressure is taken through a supply pipe from water service mains and passed through the device into a toilet supply conduit leading to the bowl of a toilet, the combination of: a body having a chamber formed therein; a main valve member adapted to close an opening between said supply pipe and said conduit; a primary actuator; means for conducting fluid from said supply pipe to said primary actuator and applying the pressure of said fluid to force said primary actuator up; means for conducting air under atmospheric pressure to said primary actuator and for applying the pressure of said air to force said primary actuator down; means connecting said primary actuator with said valve so that said primary actuator may force said valve either up or down; a secondary actu- ator subjected to the fluid pressure in said chamber to force said secondary actuator down; means for conducting air under atmospheric pressure to said secondary actuator and applying the pressure of said air to said secondary actuator to force said secondary actuator up; means by which said secondary actuator may force said valve down, said means being ineffective to force said valve up; walls forming a constricted passage between said supply pipe and said chamber; and means for manually providing an open connection between said chamber and said conduit.

2. In a device adapted to be used in a toilet flushing system in which water under pressure is taken through a supply pipe from water service mains and passed through the device into a toilet supply conduit leading to the bowl of a toilet, the combination of: a body having a cylindrical bore therein; a lower plunger sliding freely in and in fluid-tight relationship with the walls of said bore; an upper plunger placed above the lower plunger and also sliding freely in and in fluid-tight relationship with the walls of said bore, the space within said bore between said plungers being at all times in open communication with the atmosphere; means for closing the top of said bore to form an upper chamber within said bore above said upper plunger; walls forming a lower chamber within said bore below said lower plunger, there being a valve opening through said walls, said supply pipe being in open communication with said lower chamber, and said lower chamber being in open communication with said toilet supply conduit through said valve opening; a main valve adapted to close said valve opening; means by which upward movement of said lower plunger forces said valve upwardly and away from said opening and downward movement of said lower plunger forces said valve downwardly to close said opening; means by which downward movement of said upper plunger forces said valve downwardly to close said opening, said means being ineffective to force said valve upwardly; walls forming a constricted opening between said supply pipe and said upper chamber; a control valve member normally closing a channel through which said upper chamber has free communication with said conduit; and means for causing said control valve to open said channel.

3. In a device for delivering a desired quantity of liquid from a supply pipe to a discharge conduit and shutting off the flow of liquid when said quantity has been delivered, the combination of: a main valve member normally closing an opening between said pipe and said conduit; a primary actuator at all times subjected to the pressure of fluid in said pipe applied in such a manner as to tend to move said valve upwardly and away from said opening and to atmospheric pressure applied in such a manner as to tend to move said valve downwardly to close said opening; a sceondary actuator at all times subjected to atmospheric pressure; means by which said primary actuator actuates said valve; constricted means for slowly applying and normally maintaining fluid pressure from said pipe to said secondary actuator, said pressure being applied in such a manner as to move said actuator against said atmospheric pressure; means by which said secondary actuator tends to close said valve whenever the fluid pressure applied from said pipe to said actuator exceeds atmospheric pressure; and means for relieving said fluid pressure upon said secondary actuator to allow said primary actuator to open said valve.

4. In a device for delivering a desired quantity of liquid from a supply pipe to a discharge conduit and shutting off the flow of liquid when said quantity has been delivered, the combination of: a main valve member normally closing an opening between said pipe and said conduit; a primary actuator at all times subjected to the pressure of fluid in said pipe applied in such a manner as to tend to move said valve upwardly and away from said opening and to atmospheric pressure applied in such a manner as to tend to move said valve downwardly to close said opening; a secondary actuator at all times subjected to atmospheric pressure; means by which said primary actuator actuates said valve; constricted means for slowly applying and normally maintaining fluid pressure from said pipe to said secondary actuator, said pressure being applied in such a manner as to move said actuator against said atmospheric pressure; means by which said secondary actuator tends to close said valve whenever the fluid pressure applied from said pipe to said secondary actuator exceeds atmospheric pressure; and a manually operated control valve for quickly releasing said fluid pressure on said secondary actuator, said control valve being biased to quickly close when released and allow said constricted means to restore said pressure.

5. A device adapted to pass a definite quantity of water from a supply main to a toilet bowl, in which a valve is provided normally preventing the flow of water from said pipe to said bowl, which has manual means for causing said valve to be quickly opened and automatic means for thereafter slowly closing said valve, characterized by two pressure operated actuators cooperating to open said valve when said manual means is actuated (and thereafter to slowly close said valve when said manual means is released) under normal conditions of pressure in said supply main, and to cooperate to hold said valve closed when the pressure in said main falls below atmospheric pressure, there being a lost motion connection between the actuators, and the space therebetween being at all times in open communication with the atmosphere.

6. A valve device of the character described, including: a fluid delivery member having a fluid inlet and an outlet opening; a valve means having a closure element to cooperate with said outlet opening and fluid actuated means tending to move said closure element toward open position when there is fluid pressure in said delivery member and to move said closure element into a position closing said outlet opening when a condition of vacuum is exerted in said delivery member; a fluid operated mechanism having a moving part which is movable between holding position and releasing position in accordance with the presence or absence of fluid pressure in said mechanism, said moving part in said holding position maintaining said closure element in its position closing said outlet opening; and means for controlling the fluid pressure in said fluid operated mechanism.

In testimony whereof, I have hereunto set my hand at Los Angeles, California, this 2nd day of January, 1931.

WALTER PUTNAM.